United States Patent
Willems

(10) Patent No.: US 9,353,826 B2
(45) Date of Patent: May 31, 2016

(54) DAMPER BEARING FOR SUPPORTING A CHASSIS COMPONENT ON A MOTOR VEHICLE BODY

(75) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 68 days.

(21) Appl. No.: 14/342,211

(22) PCT Filed: Jul. 18, 2012

(86) PCT No.: PCT/EP2012/003015
§ 371 (c)(1),
(2), (4) Date: May 27, 2014

(87) PCT Pub. No.: WO2013/029717
PCT Pub. Date: Mar. 7, 2013

(65) Prior Publication Data
US 2015/0108321 A1    Apr. 23, 2015

(30) Foreign Application Priority Data
Sep. 3, 2011 (DE) .......................... 10 2011 112 405

(51) Int. Cl.
*B62D 21/00* (2006.01)
*F16F 15/08* (2006.01)
(Continued)

(52) U.S. Cl.
CPC ............ *F16F 15/085* (2013.01); *B60G 99/002* (2013.01); *F16F 3/10* (2013.01); *F16F 9/54* (2013.01); *F16F 2224/0283* (2013.01)

(58) Field of Classification Search
CPC ..... F16F 13/16; F16F 3/10; F16F 2224/0283; B60G 15/068

USPC .............. 248/560, 562; 280/707; 188/321.11; 267/220; 180/312

See application file for complete search history.

(56) References Cited

U.S. PATENT DOCUMENTS

| 5,291,967 A * | 3/1994 | Aoki ..................... F16F 15/005 180/312 |
| 5,330,166 A | 7/1994 | Aoki |
| 2004/0079600 A1 | 4/2004 | Schutz |

FOREIGN PATENT DOCUMENTS

| CN | 1560491 | 1/2005 |
| DE | 41 42 885 A1 | 7/1992 |

(Continued)

OTHER PUBLICATIONS

Chinese Search Report issued by the Chinese Patent Office in counterpart Chinese Patent Application No. 2012800437542 on Jun. 3, 2015.

(Continued)

*Primary Examiner* — Todd M Epps
(74) *Attorney, Agent, or Firm* — Henry M. Feiereisen LLC.

(57) ABSTRACT

The invention relates to a damper bearing (10) for supporting a chassis component on a motor vehicle body, including a first bearing element (12) for attachment to the motor vehicle body, a second bearing element (14) for attachment to the chassis component, and a damping element (16) which is active between the first and the second bearing elements (12, 14) and which is made of a shock-absorbing material. The invention is characterized in that a coupling element (18) is arranged between the first and the second bearing elements (12, 14), with the second bearing element (14) interacting via the coupling element with at least one active spring element (20) which is arranged on the coupling element (18) and effective in series with the damping element (16).

10 Claims, 1 Drawing Sheet

(51) Int. Cl.
  *F16F 9/54* (2006.01)
  *B60G 99/00* (2010.01)
  *F16F 3/10* (2006.01)

(56) References Cited

FOREIGN PATENT DOCUMENTS

| DE | 42 19 151 A1 | 1/1993 |
| DE | 42 30 800 A1 | 3/1994 |
| DE | 196 42 827 A1 | 10/1997 |
| DE | 199 35 391 A1 | 2/2001 |
| DE | 100 39 763 A1 | 2/2002 |
| DE | 101 47 604 A1 | 5/2003 |
| DE | 103 51 303 A1 | 5/2005 |
| DE | 10 2004 032 470 | 1/2006 |
| JP | S5965640 A | 4/1984 |

OTHER PUBLICATIONS

Translation of Chinese Search Report issued by the Chinese Patent Office in counterpart Chinese Patent Application No. 2012800437542 on Jun. 3, 2015.

\* cited by examiner

DAMPER BEARING FOR SUPPORTING A CHASSIS COMPONENT ON A MOTOR VEHICLE BODY

CROSS-REFERENCES TO RELATED APPLICATIONS

This application is the U.S. National Stage of International Application No. PCT/EP2012/003015, filed Jul. 18, 2012, which designated the United States and has been published as International Publication No. WO 2013/029717 and which claims the priority of German Patent Application, Serial No 10 2011 112 404.9, filed Sep. 3, 2011, pursuant to 35 U.S.C. 119(a)-(d).

BACKGROUND OF THE INVENTION

The invention relates to a damper bearing for supporting a chassis component of a motor vehicle body.

Such damper bearings are known in many configurations and are used for example in wheel suspensions of motor vehicles. They typically connect a shock absorber or a suspension strut which includes a shock absorber, to the body of the motor vehicle. In addition to the support function, the damper bearing should also provide in particular for an acoustic decoupling and damping.

A generic damper bearing is disclosed for example in DE 101 47 604 A1. A drawback resides in the inadequate damping properties in the audible range when especially high-frequency excitations are involved.

SUMMARY OF THE INVENTION

The invention is based on the object to improve a damper bearing for supporting a chassis component on a motor vehicle body, so that a good acoustic damping is ensured when high-frequency excitations are involved.

This object is achieved by a damper bearing for supporting a chassis component on a motor vehicle body, including a first bearing element for attachment to the motor vehicle body, a second bearing element for attachment to the chassis component, a damping element of a shock-absorbing material acting between the first and second bearing elements, and a coupling element arranged between the first and second bearing elements, with the second bearing element interacting via the coupling element with at least one controllable active spring element which is arranged on the coupling element and effective in series with the damping element.

The subclaims form advantageous refinements of the invention.

In a known manner, the damper bearing for supporting a chassis component of a motor vehicle body includes a first bearing element for securement of the bearing to the motor vehicle body, and a second bearing element which is fixedly connected to the chassis component. A damping element is arranged between the two bearing elements and made of a shock-absorbing material.

In accordance with the invention, a coupling element is arranged between the first and second bearing elements. The second bearing element interacts via the coupling element with at least one controllable active spring element which is arranged on the coupling element and effective in series with the damping element.

The provision and arrangement of the controllable active spring element according to the invention now provides in an advantageous manner a damper bearing which enables a reduction/attenuation of interfering, high excitation frequencies over a wide frequency band by a targeted vibration superposition. This is accompanied by a significant increase of tire comfort and acoustic comfort.

According to a first embodiment of the invention, the damper element is arranged between the first bearing element and the coupling element, and the second bearing element is supported on the coupling element via the at least one active spring element. This embodiment has shown to be advantageous because the high-frequency excitations are directly compensated by the active spring element and not transferred by way of the detour via the damper element.

Preferably, a bump stop is formed between the second bearing element and the coupling element. The arrangement of a bump stop has proven advantageous since for great excitation amplitudes a second load path is provided for the protection of components of the active spring element.

According to a second embodiment of the invention, the damping element is arranged between the coupling element and the second bearing element, and the coupling element is supported via the at least one active spring element on the first bearing element. This embodiment has proven advantageous because only the high-frequency excitations are transmitted to the active spring element. The damping element acts here like a high pass filter.

Preferably, a bump stop is also provided in this embodiment. It is preferably arranged between the first bearing element and the damping element. An arrangement of the bump stop between the first bearing element and the coupling element is also conceivable. The bump stop again provides a second load path to prevent damage/destruction of the active spring element in the case of great excitation amplitudes.

Preferably, the bump stop is formed from an elastomeric material. The configuration of the bump stop of an elastomeric material proves advantageous since an additional damping effect of the bearing is provided.

According to a further advantageous embodiment, the active spring elements are formed as piezo actuators. The configuration of the active spring elements as piezo actuators has the advantage of requiring little space and providing rapid response time.

BRIEF DESCRIPTION OF THE DRAWING

Further advantages, features and use possibilities of the present invention become apparent from the following description in conjunction with the exemplary embodiments illustrated in the drawings.

Exemplary embodiments of the invention will be described hereinafter in greater detail with reference to the drawings.

Figure 1:
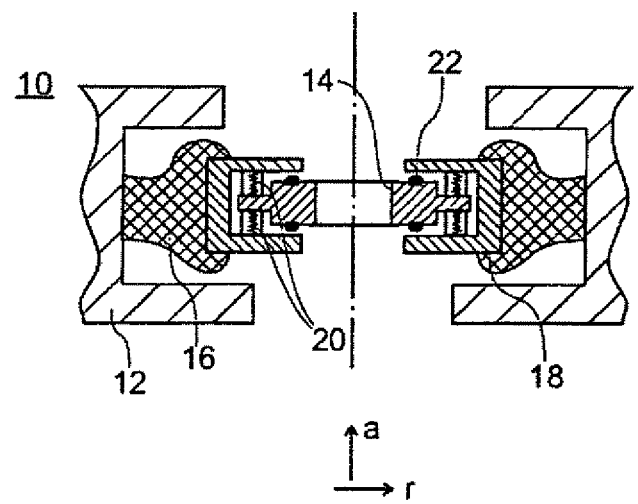

The description, claims and drawing use the terms referred to in the below list of reference signs and reference signs that are associated thereto.

Figure 2:
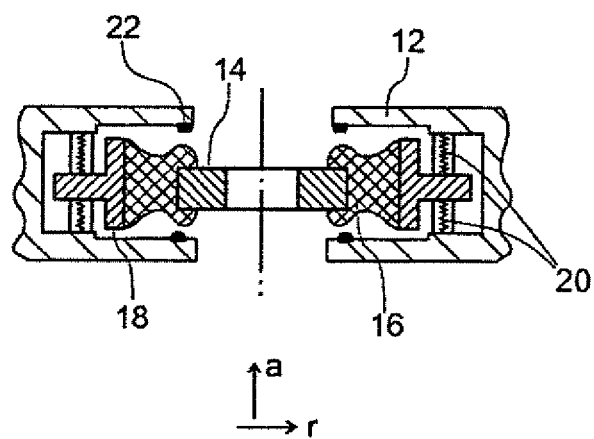

The drawing shows in:

FIG. 1 a sectional view of a first embodiment of the damper bearing according to the invention, and FIG. 2 a sectional view of a second embodiment of the damper bearing according to the invention.

DETAILED DESCRIPTION OF PREFERRED EMBODIMENTS

In the following description and in the figures, same parts and components are designated by same reference numerals to avoid repetition, so long as no further differentiation is necessary or advisable.

FIG. 1 shows a damper bearing, generally designated by reference numeral 10.

The damper bearing 10 includes a first bearing element 12 for attachment to a motor vehicle body and a second bearing element 14 for attachment to e.g. the piston rod of a damper module. For ease of illustration, the motor vehicle body and the piston rod have not been illustrated here.

A damping element 16 of a shock-absorbing material is arranged between the first bearing element 12 and the second bearing element 14. The damper element 16 is here vulcanized into the first bearing element 12 and realizes a spring damper effect in axial and wobbling movements.

As can be further seen in FIG. 1, a coupling element 18 is arranged between the damping element 16 and the second bearing element 14, as viewed in radial direction r. The coupling element 18 is fixedly connected radially outside to the damping element 16. When viewed in axial direction a, the second bearing element 14 is supported by upper and lower controllable active spring elements 20, respectively arranged on the coupling element 18 and effective in series with the damping element 16.

In addition, upper and lower bump stops 22 are arranged between the second bearing element 14 and the coupling element 18, when viewed in axial direction a. The bump stops 22 are made here from an elastomeric material.

The forces are introduced into the damper bearing 10 via the second bearing element 14. The force transfer from the second bearing element 14 to the coupling element 18 and from there, via the damping element 16 to the first bearing element 12 is implemented via the controllable active spring elements 20. The controllable active spring elements, configured here as piezo actuators, can be excited in phase opposition to the second bearing element 14 and thus apply a dampening effect.

In the presence of great excitation amplitudes on the second bearing element 14, the second bearing element 14 directly interacts via the bump stops 22 with the coupling element 18 so that a wobbling motion of the damper and excitation of great amplitudes are directly absorbed by the damping element 16 like in a conventional damper bearing.

In the exemplary embodiment shown in FIG. 2, the damping element 16 is arranged between the coupling element 18 and the second bearing element 14, as viewed in radial direction r. The coupling element 18, in turn, is supported, as viewed in axial direction a, on the first bearing element 12 via upper and lower controllable active spring elements 20 which are effective in series to the damping element 16.

Furthermore—as can be seen from FIG. 2—upper and lower bump stops 22 of an elastomeric material are arranged, when viewed in axial direction a, between the first bearing element 12 and the damping element 16.

The force introduction into the damper bearing 10 is again realized via the second bearing element 14. The force is introduced from the second bearing element 14 via the damper element 16, coupling element 18 and the controllable active spring elements 20 to the first bearing element 12. The controllable, active spring elements 20 can again be excited in phase opposition to the second bearing element 14 in a targeted manner.

What is claimed is:

1. A damper bearing for supporting a chassis component on a motor vehicle body, comprising:
    a first bearing element configured for attachment to the motor vehicle body;
    a second bearing element configured for attachment to the chassis component;
    a damping element made of a shock-absorbing material and acting between the first and second bearing elements;
    a coupling element arranged between the first and second bearing elements;
    at least one controllable active spring element arranged on the coupling element and effective in series with the damping element, said second bearing element interacting with the spring element via the coupling element; and a bump stop arranged between the second bearing element and the coupling element.

2. The damper bearing of claim 1, wherein the damping element is arranged between the first bearing element and the coupling element, said second bearing element being supported via the at least one active spring element on the coupling element.

3. The damper bearing of claim 1, wherein the bump stop is made of an elastomeric material.

4. The damper bearing of claim 1, wherein the damping element is arranged between the coupling element and the second bearing element, said coupling element being supported via the at least one active spring element on the first bearing element.

5. The damper bearing of claim 1, wherein the active spring element is configured as a piezo actuator.

6. The damper bearing of claim 1, further comprising a second bump stop, said bump stops located in axially spaced-apart relationship on opposite sides of the second bearing element.

7. A damper bearing for supporting a chassis component on a motor vehicle body, comprising:
    a first bearing element configured for attachment to the motor vehicle body;
    a second bearing element configured for attachment to the chassis component;
    a damping element made of a shock-absorbing material and acting between the first and second bearing elements;
    a coupling element arranged between the first and second bearing elements;
    at least one controllable active spring element arranged on the coupling element and effective in series with the damping element, said second bearing element interacting with the spring element via the coupling element; and a bump stop arranged between the first bearing element and the damping element.

8. The damper bearing of claim 7, wherein the bump stop is made of an elastomeric material.

9. The damper bearing of claim 7, further comprising a second bump stop, said bump stops being arranged on confronting sides of the first bearing element at a distance to the opposite sides of the damping element, respectively.

10. A damper bearing for supporting a chassis component on a motor vehicle body, comprising:
    a first bearing element configured for attachment to the motor vehicle body;
    a second bearing element configured for attachment to the chassis component;
    a damping element made of a shock-absorbing material and acting between the first and second bearing elements;
    a coupling element arranged between the first and second bearing elements;
    at least one controllable active spring element arranged on the coupling element and effective in series with the damping element, said second bearing element interacting with the spring element via the coupling element; and a bump stop arranged between the first bearing element and the coupling element.

* * * * *